Jan. 23, 1940.　　A. G. KERSHAW ET AL　　2,187,940
SLACK ADJUSTER
Filed March 26, 1938　　2 Sheets-Sheet 1
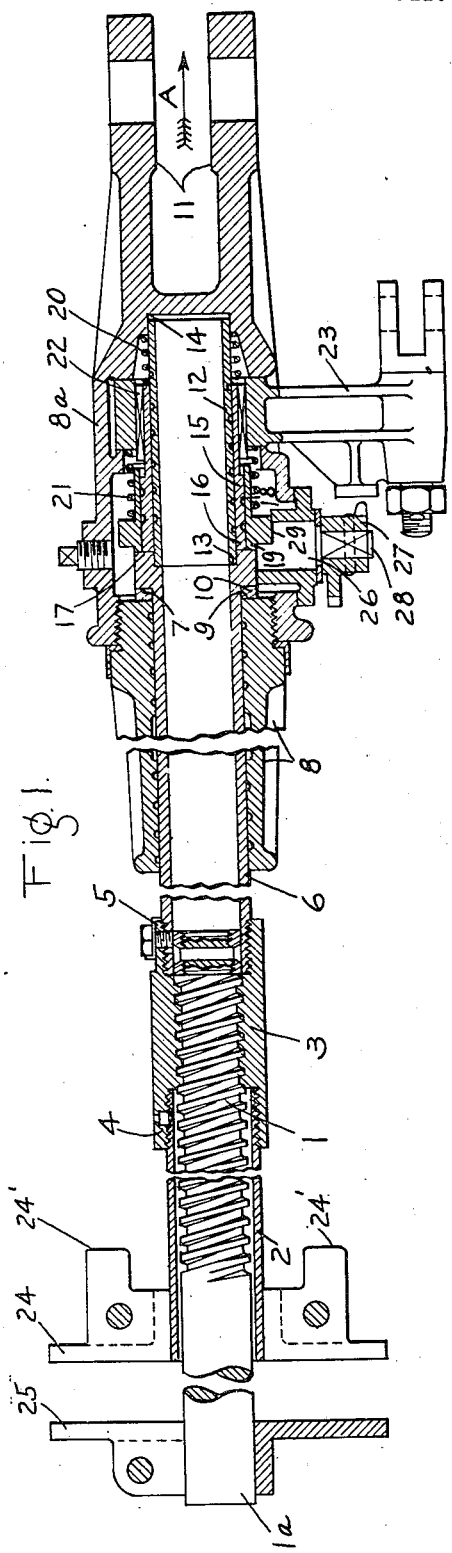
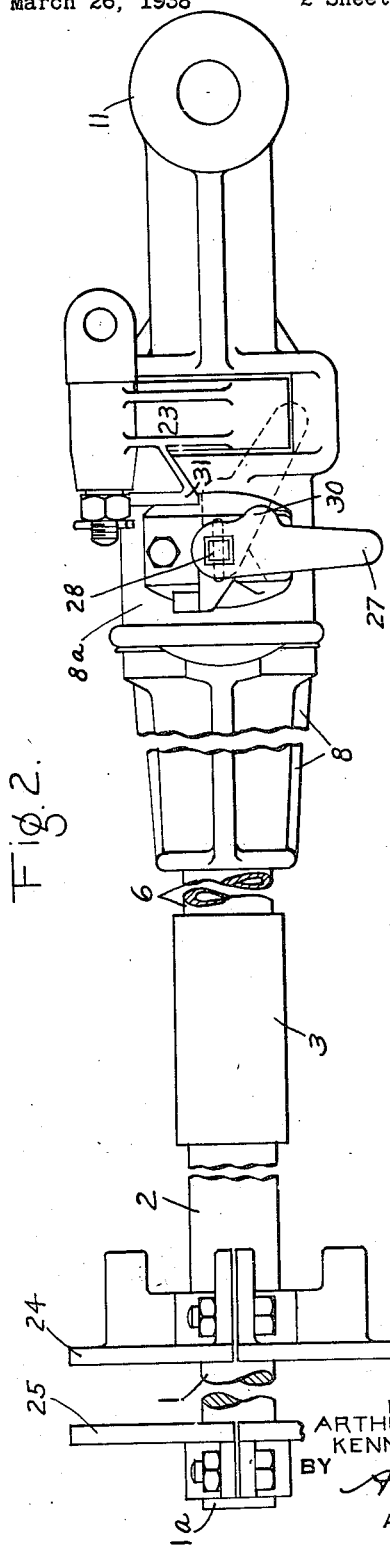
INVENTORS
ARTHUR G. KERSHAW
KENNETH H. LEECH
BY
ATTORNEY

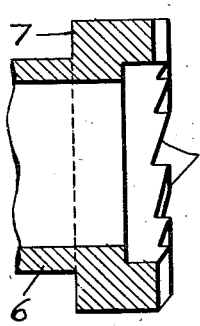
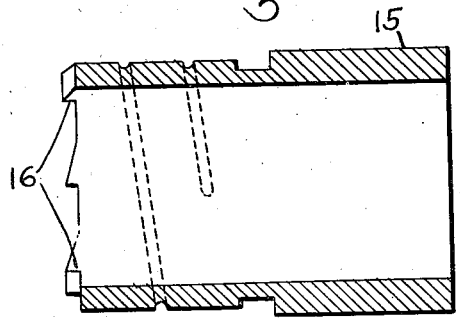
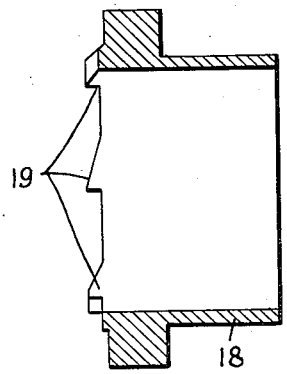
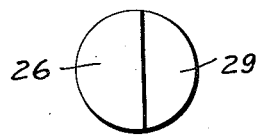
INVENTORS
ARTHUR G. KERSHAW
KENNETH H. LEECH
BY
ATTORNEY Patented Jan. 23, 1940

2,187,940

UNITED STATES PATENT OFFICE 2,187,940

SLACK ADJUSTER

Arthur Greenwood Kershaw and Kenneth Howard Leech, London, England, assignors, by mesne assignments, to The Westinghouse Air Brake Company, Wilmerding, Pa., a corporation of Pennsylvania Application March 26, 1938, Serial No. 198,252
In Great Britain May 10, 1937

5 Claims. (Cl. 188—202)

This invention relates to automatic slack adjusting devices for braking apparatus of the well known kind in which the slack in the brake rigging is arranged to be adjusted automatically, so as to maintain the slack substantially constant under all conditions, by means of screw and nut mechanism adapted to be operated during a stage of movement of the brake rigging through the intermediary of a suitable unidirectional clutch device by an operating arm adapted to be moved relatively to the slack adjusting device during the movement of the brake rigging.

In order to enable a slack adjusting device of this general kind to be re-set after the maximum automatic adjustment permitted by the screw and nut mechanism has been effected, manually operable arrangements are provided for disengaging the uni-directional clutch device so as to permit the manual adjustment of the screw and nut mechanism in the reverse direction to that effected automatically. For example, at least one cam provided with a suitable operating handle or lever may be associated with the uni-directional clutch device, this cam being adapted to be moved to one position by means of the handle or lever so as to disengage the uni-directional clutch device for permitting re-setting of the slack adjusting device, and to be moved to another position so as to permit the uni-directional clutch device to be reengaged for further automatic adjustment after the slack adjusting device has been re-set.

In the event of the uni-directional clutch device being left in its disengaged condition after re-setting has been effected, or should the manually operable arrangements be accidentally moved to the position in which the clutch is disengaged, the slack adjusting device would as will be evident be inoperative.

According to the principal feature of the present invention, however, in order to avoid this disadvantage, the uni-directional clutch device is arranged to be re-engaged automatically as a result of the movement of the slack adjusting device or a part thereof in effecting an application of the brakes.

For example, the handle or lever of the manually operable clutch disengaging arrangements may be arranged to project, when the clutch is disengaged, into the path traversed in applying the brakes by the operating arm of the slack adjusting device or a member secured thereto and be arranged to be engaged by the operating arm or member secured thereto and moved by this arm or member in applying the brakes to its clutch engaged position.

In order that the invention may be readily understood it will now be described, by way of example, with reference to the accompanying drawings, as applied to a slack adjusting device more particularly suitable for fluid pressure braking apparatus on railway and the like vehicles.

In the accompanying drawings Figure 1 is a view of the slack adjusting device mainly in vertical central longitudinal section; Figure 2 is a plan view of the device from below; Figures 3 to 5 are sectional views of details of the slack adjuster device; and Figure 6 a plan view of a further detail of the slack adjuster device.

Referring now in detail to the drawings, the slack adjusting device comprises a screw-threaded rod 1 enclosed in a tubular sleeve 2 and co-operating with a correspondingly screw-threaded nut 3 secured at its outer end 4 to the tubular sleeve 2 and at its inner end 5 to a tubular member 6 having an enlarged portion at its inner end forming an annular shoulder 7. The tubular member 6 is mounted in a bearing portion 8 of the hollow body 8a of the slack adjusting device which is provided with an annular shoulder 9 adapted to cooperate through the intermediary of a suitable packing ring 10 with the external shoulder 7 of the tubular member 6.

The outer end 1a of the screw-threaded rod 1 is arranged to be coupled to the usual brake shoes through suitable rigging (not shown) and the hollow body 8a of the slack adjusting device is provided with an eye portion 11 adapted to be connected, usually through a lever or levers, (not shown) to the usual braking cylinder piston rod, (not shown).

Located within the hollow body 8a of the device is a bearing sleeve 12 suitably supported at its opposite ends in a recess 13 in the shouldered end of the tubular member 6 on the one hand and a recess 14 in the hollow body 8a on the other hand. On this bearing sleeve 12 is rotatably mounted a tubular driving ratchet member 15 having at one end a number of inclined ratchet teeth 16 (Figure 4) adapted to co-operate with the inner portions of correspondingly oppositely inclined teeth 17 (Figure 3) on the shouldered end of the tubular member 6. A tubular locking ratchet member 18 is mounted on the driving ratchet member 15 and has at one end a number of ratchet teeth 19 (Figure 5) similar to those on the driving ratchet member 15 and co-operating with the outer portions of the teeth 17 on the shouldered end of the tubular member 6, suitable springs 20 and 21 being provided to urge the driving and the locking ratchet members respectively into engagement with the shouldered end of the tubular member 6.

The driving ratchet member 15 is operatively coupled by means of splines 22 to a rockable operating arm 23 of the slack adjusting device so that the driving ratchet member 15 can move in the direction of the longitudinal axis of the slack adjusting device with respect to the arm 23, whilst said arm is adapted to be rotated by any suitable arrangements so as to rotate the driving ratchet member 15 around the longitudinal axis of the slack adjusting device during movement of the brake rigging, it being understood that the locking ratchet member 18 is suitably secured against rotary movement. The operating arm 23 may be coupled to one end of a bell-crank lever (not shown) carried by the brake cylinder piston cross-head (not shown) by a suitable link (not shown), the other end of the lever being anchored to the brake cylinder or other suitable fixed portion of the braking apparatus or vehicle, whereby said arm will be rocked upon movement of the brake cylinder piston, such arrangements however not forming part of the present invention and not being shown in the drawings.

In operation, when a pull is exerted in the direction A (Figure 1) on the slack adjusting device by the movement of the brake cylinder piston the hollow body 8a and with it the bearing portion 8 of the device is moved in the direction of the arrow A and carries with it, owing to the co-operation between the shoulders 7 and 9 referred to hereinbefore, the tubular member 6, the nut 3 and the screw-threaded rod 1 thereby applying the brakes.

During this movement the operating arm 23 is adapted to rotate the driving ratchet member 15 in such a direction that the teeth 16 on this member slip over the inclined faces of the teeth 17 on the tubular member 6, the locking ratchet member 18 positively preventing the tubular member 6 from being rotated. In the event of the slack in the rigging exceeding a predetermined amount the driving ratchet member 15 will be rotated with respect to the tubular member 6 by an amount corresponding to the distance between two adjacent ratchet teeth and, when the brakes are being released and the operating arm 23 being returned to its original position, the driving ratchet member 15 will rotate the tubular member 6 by an amount corresponding to the distance between two adjacent ratchet teeth. The rotation of the tubular member 6 is transmitted to the nut 3 and the rotation of the latter with respect to the screw-threaded rod 1 will decrease the slack in the rigging by a corresponding amount.

As wear of the brake blocks occurs progressively the slack adjusting device operates progressively to take up more and more slack, whilst the screw-threaded rod 1 gradually enters the tubular member 6 until eventually the nut 3 arrives at or near the outer end of the screw and no further automatic adjustment is possible until the device is re-set.

In order to provide a readily visible indication as to the condition of the slack adjusting device at any time a disc or other member such as 24 is secured or clamped to the outer end of the tubular sleeve 2 secured to the nut 3 and another disc or other member such as 25 is secured or clamped to the outer end 1a of the screw-threaded rod 1. These discs or indicating members 24 and 25 are so arranged that when the device is re-set they are spaced apart at a distance corresponding or substantially equal to the maximum amount of slack capable of being taken up by the device between one re-setting and the next, so that as will be apparent the distance apart of the discs or other indicating members will give a ready indication of the operative condition of the slack adjusting device. When the two discs or indicating members 24 and 25 are observed to be substantially in engagement with one another it will be apparent that re-setting of the device is necessary. The disc or indicating member on the tubular sleeve 2 secured to the nut 3 may be provided with extended lugs or ears 24' to serve for the ready rotation of the nut 3 in re-setting the device.

In order to permit the re-setting of the device a cam 26 having an operating handle or lever 27 is associated with the ratchet members 15 and 18, this cam 26 being adapted to be moved to one position by means of the handle or lever 27 so as to disengage the ratchet teeth 16 and 19 on the members 15 and 18 from the ratchet teeth 17 on the tubular member 6 for permitting re-setting of the slack adjusting device and to be moved to another position so as to permit the ratchet teeth 16 and 19 to be re-engaged with the ratchet teeth 17 for further automatic adjustment after the slack adjusting device has been re-set.

The cam 26 comprises a substantially cylindrical member having an operating stem 28 at its outer end and a cut away portion 29 (Figure 6) at one side of its inner end which permits the ratchet members 15 and 18 to be moved into engagement with the tubular member 6 by the action of the springs 20 and 21 when the cam 26 is rotated to the position in which it is shown in the drawings corresponding to the position of the handle or lever 27 indicated by full lines in Figure 2. The cam 26 is mounted in the body portion 8a, at the under side of the slack adjusting device, with its axis at right angles to the longitudinal axis of the device, and outside the body portion 8a the stem 28 of the cam 26 is provided with the operating handle or lever 27. This handle or lever 27 has a projection 30 (Figure 2) which is arranged to project, when the ratchet members are disengaged by movement of the lever 27 to the position indicated by dot and dash lines in Figure 2, into the path traversed in applying the brakes by a lug 31 on the operating arm 23 of the slack adjusting device and is arranged to be engaged by the lug 31 so that the lever 27 is moved by this lug in applying the brakes to the position in full lines in Figure 2, in which the ratchet members are engaged.

Thus should the cam 26 be left inadvertently in the position in which the ratchet members 15 and 18 are disengaged from the ratchet teeth 17 of the tubular member 6, these members will automatically be re-engaged as a result of the movement of the operating arm 23 of the slack adjusting device in effecting the first subsequent application of the brakes.

It will be evident that the invention is not limited to the particular construction and arrangement of the parts hereinbefore described by way of example which may be varied as desired to suit particular requirements without exceeding the scope of the invention.

Having now described our invention, what we claim as new and desire to secure by Letters Patent, is:

1. A slack adjuster device for the brake rigging of a fluid pressure brake system comprising slack take-up means, a clutch device operatively connected to said take-up means for effecting the operation thereof to take up slack, manually operative means for releasing said clutch device to render said take-up means operable independently of said clutch device, and actuating means operative automatically to effect operation of said manually operative means to render said clutch device effective to operate said take-up means and to also effect operation of said clutch device to operate said take-up means.

2. A slack adjuster device for the brake rigging of a fluid pressure brake system comprising slack take-up means, a clutch device operatively connected to said take-up means for effecting the operation thereof to take up slack, actuating means operative automatically to effect operation of said clutch device to operate said take-up means and a manually operative lever connected to said clutch device for releasing said clutch device to render said take-up means operable independently of said clutch device, said actuating means being operative upon movement to operate said clutch device to effect operation of said lever to render said clutch device effective to operate said take-up means.

3. A slack adjuster device for the brake rigging of a fluid pressure brake system comprising slack take-up means, a clutch device operatively connected to said take-up means for effecting the operation thereof to take up slack, a movable member operative automatically to effect operation of said clutch device to operate said take-up means, and means including a manually operative lever movable into the path traversed by said movable member in operating to take up slack, for releasing said clutch device to render said take-up means operable independently of said clutch device, said movable member being operative upon movement to take up slack to operate said lever to render said clutch device effective.

4. A slack adjuster device for the brake rigging of a fluid pressure brake system comprising slack take-up means, a driven ratchet member operative upon turning in one direction to effect the operation of said take-up means to take up slack, a driving ratchet member cooperative with said driven member to effect operation thereof, a third ratchet member secured against turning and cooperative with said driven member to hold said driven member against turning in the reverse direction, a rockable member connected to said driving member for effecting the operation thereof to turn said driven member, means operative to release said driving member and said third ratchet member from said driven member to render said driven member turnable in said reverse direction, and means operable by said rockable member, upon movement to effect operation of said driving member, to operate said release means to effect cooperative engagement between said driven member and said driving member and said third ratchet member.

5. A slack adjuster device for the brake rigging of a fluid pressure brake system comprising a slack take-up screw, a nut on said screw operative upon rotation in one direction on said screw to operate said screw to take up slack, ratchet means operatively connected to said nut for rotating said nut, a rockable member operative to effect operation of said ratchet means, means including a lever operative to effect operation of said ratchet means to release said nut for rotation in the opposite direction, and means operative by said member upon movement to effect operation of said ratchet means to operate said lever to condition said ratchet means for rotating said nut.

ARTHUR GREENWOOD KERSHAW.
KENNETH HOWARD LEECH.